No. 645,590. Patented Mar. 20, 1900.
C. A. FILION.
MACHINE FOR MAKING CALKS.
(Application filed Oct. 4, 1899.)
(No Model.) 2 Sheets—Sheet 1.
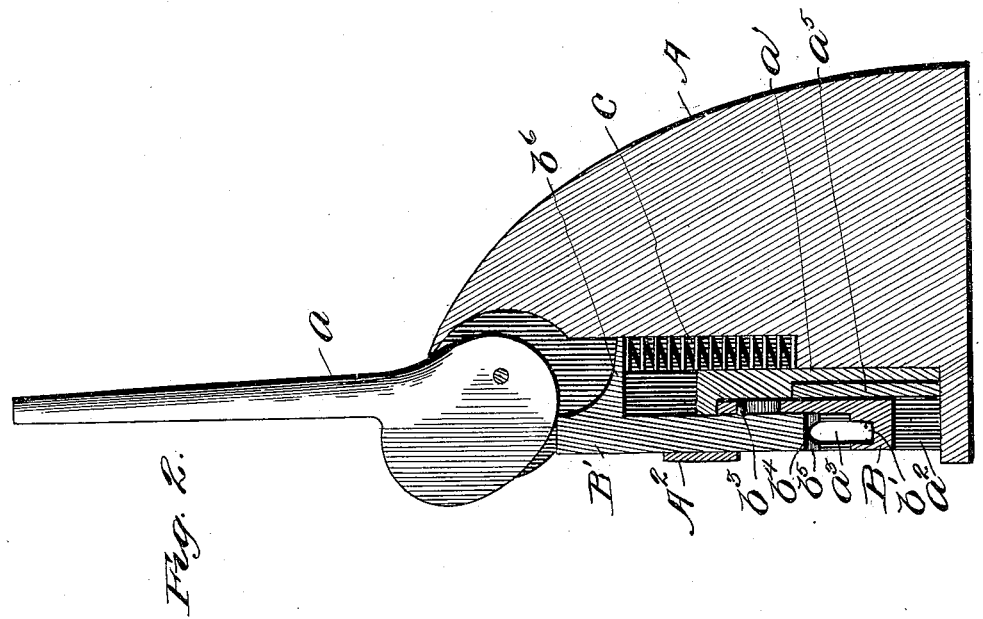
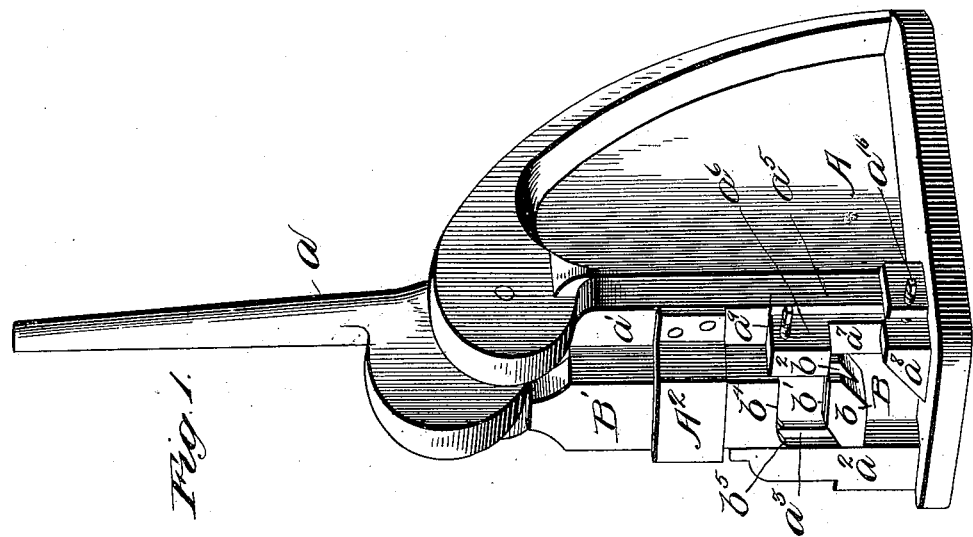
Witnesses: Camil A. Filion, Inventor
By Marion & Marion
Attorneys
THE NORRIS PETERS CO., PHOTO-LITHO., WASHINGTON, D. C.

No. 645,590. Patented Mar. 20, 1900.
C. A. FILION.
MACHINE FOR MAKING CALKS.
(Application filed Oct. 4, 1899.)
(No Model.) 2 Sheets—Sheet 2.
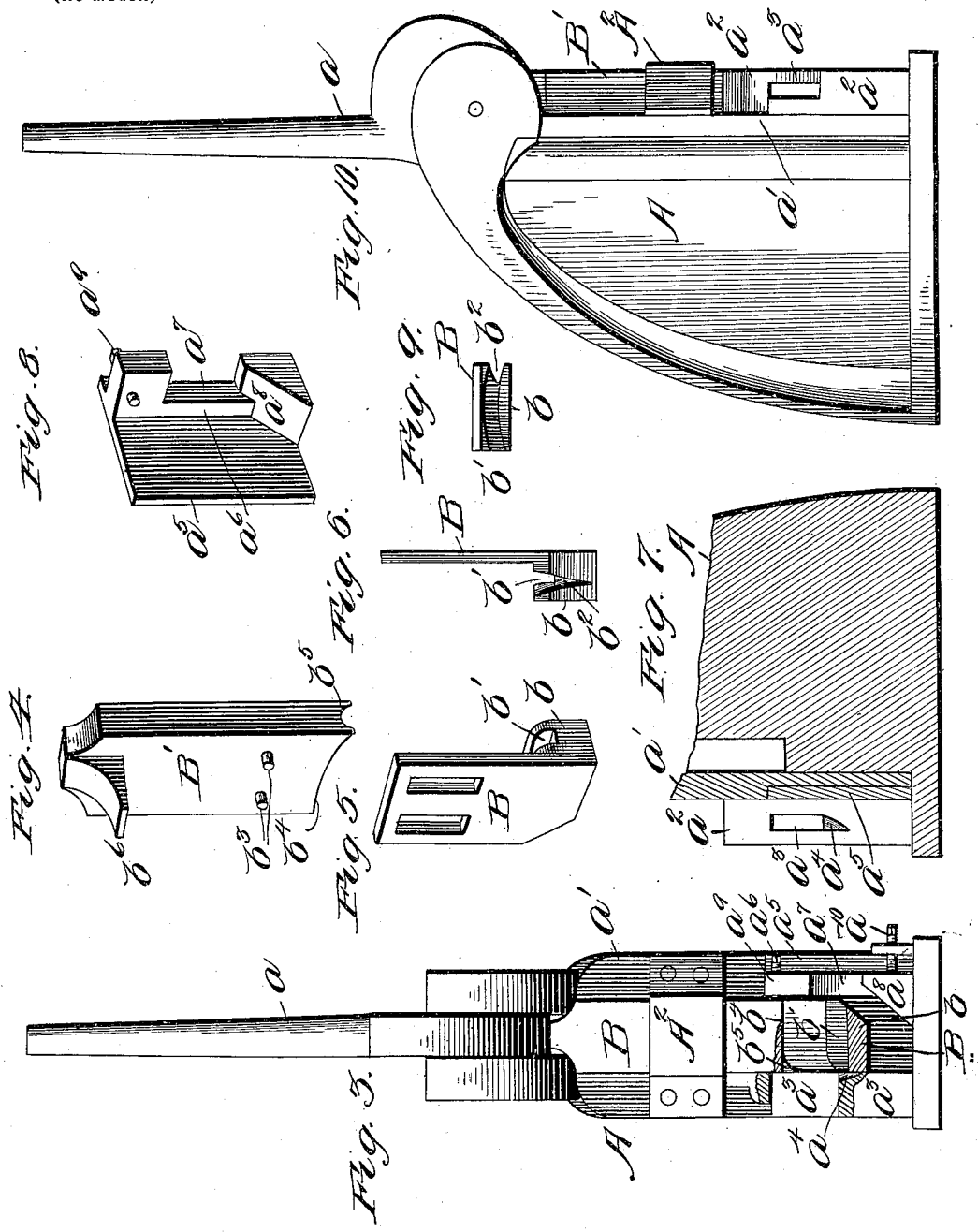
Camil A. Filion, Inventor
By Marion & Marion
Attorneys
Witnesses:

UNITED STATES PATENT OFFICE.

CAMIL ABONDEUS FILION, OF WHITING, VERMONT.

MACHINE FOR MAKING CALKS.

SPECIFICATION forming part of Letters Patent No. 645,590, dated March 20, 1900.

Application filed October 4, 1899. Serial No. 732,466. (No model.)

*To all whom it may concern:*

Be it known that I, CAMIL ABONDEUS FILION, a subject of the Dominion of Canada, residing at Whiting, county of Addison, State of Vermont, have invented certain new and useful Improvements in Machines for Making Calks; and I do hereby declare that the following is a full, clear, and exact description of the invention, such as will enable others skilled in the art to which it appertains to make and use the same.

This invention relates to machines for making calks; and one object is to provide a machine of this character in which the calk is made complete and severed from the bar at one operation, thus requiring no subsequent finishing.

A further object is to provide a calk-making machine which is simple in construction, effective in operation, and which can be manufactured at a moderate cost.

To these ends the invention consists in a machine for making calks constructed substantially as herein illustrated and described, and defined in the appended claims.

Referring to the drawings, in which similar letters of reference indicate similar parts, Figure 1 is a view in perspective of a machine for making calks constructed in accordance with this invention. Fig. 2 is a longitudinal central section thereof. Fig. 3 is a front elevation, parts being broken away to show the construction. Figs. 4 and 5 are views in perspective of the cutting and forming dies. Fig. 6 is an edge view of Fig. 5. Fig. 7 is a view of the lower portion of Fig. 2, parts being removed to show details of construction. Fig. 8 is a view in perspective of the adjusting-plate. Fig. 9 is a top view of Fig. 6. Fig. 10 is a side elevation.

In the drawings, A represents a frame, which may be of any usual or preferred form, having a recess in its front edge, in the upper portion of which is pivoted a suitable lever $a$, having a cam-face. Secured to the front edge of the frame A is a plate $a'$, which is provided with a flange $a^2$ at one side, through which is formed a slot $a^3$ for the passage of the metal bar from which the calks are formed. The lower edge of the inner portion of the slot $a^3$ is provided with a downwardly-extending groove $a^4$, which is beveled and inclined inwardly, as shown in Fig. 3. The plate $a'$ is recessed at its lower portion to afford a seat for the adjustable plate $a^5$, which is provided upon its outer edge with a flange $a^6$, having the opening $a^7$ formed therein. The inner portion of the bottom of the flange $a^6$ is provided with a beveled lug $a^8$.

The upper portion of the flange $a^6$ of the adjusting-plate $a^5$ is provided with a suitable adjusting-screw $a^9$, and the lower edge of the plate $a'$ is provided with a lug through which passes an adjusting-screw $a^{10}$, adapted to bear against the lower portion of the flange $a^6$ of the adjusting-plate $a^5$, whereby the said plate is adjusted toward the flange $a^2$ of the plate $a'$, as is clearly shown in Fig. 3.

In the space between the flange $a^2$ of the plate and the flange $a^6$ of the adjusting-plate $a^5$ is slidably mounted the lower die B for shaping the calk, the lower portion of which is provided with a lug $b$, the surface of which is provided with a suitable groove or recess $b'$, which gives the proper shape to the body of the calk. The outer edge of the lug $b$ is inwardly beveled to conform with the bevel or inclined surface of the lug $a^8$, with which it coacts to give the proper inclination to the spur of the calk and smoothly finish the outer end of said calk. A suitable groove $b^2$ is formed in the face of the beveled lug $b$, which tapers to a point, which also aids in giving the proper shape to the spur of the calk. The upper portion of the die B is provided with slots, in which engage the pins $b^3$, formed upon the rear side of the upper die B', and whereby the lower die B is moved in performing its work.

The lower face of the die B' is provided with a flat surface $b^4$, which terminates on the side adjacent to the flange $a^2$ in a downwardly-extending cutting edge $b^5$, which is preferably grooved, as shown, to aid in shaping the spur of the calk. The upper end of the upper cutting-die B' is provided with an inwardly-extending lug $b^6$, which projects into the recess of the frame A and is adapted to engage the end of a coiled spring C, seated within said recess and by which the cutting-die B' is returned to its normal raised position, as shown in Fig. 2. The upper extremity of the cutting-die B' is squared and is adapted to be engaged by the cam of the lever $a$.

A suitable bracket $A^2$ is secured across the face of the frame A and serves to retain the cutting-die B' in its operative position.

The calks are formed from a long bar of metal which is passed through the slot $a^3$ between the dies B and B'. The lever $a$ is then depressed, forcing the die B' down upon the bar and shaping the calk by compressing the metal of the bar into the groove $b'$ of the die B and the flat portion of the die B'. A further depression of the lever $a$ cuts off the end of the bar, leaving a partially-formed spur on the end of the bar. This spur is formed by the die B' pressing the metal of the bar into the groove $a^4$ of the plate $a'$, the recessed edge $b^5$ of the die B' permitting the formation of the spur prior to its being severed by the further depression of the lever $a$. The bar is then passed through the slot $a^3$ a distance equal to the length of the calk and the lever $a$ again depressed. At this operation the spur formed by the first operation lies in the groove $b^2$ and is forced against the beveled surface of the lug $a^8$, and thus given the requisite shape and finish, and at the same time the spur is formed on the next calk, while the finished calk is severed from the bar. The adjustment of the plate $a^5$ regulates the size and shape of the finished spur, as will be readily understood.

While I have herein shown a preferred form of carrying my invention into effect, yet I do not desire to limit myself to such preferred details of construction, but claim the right to use any and all modifications thereof which will serve to carry into effect the objects to be attained by this invention in so far as such modifications and changes may fall within the spirit and scope of my said invention.

I claim—

1. A machine for making calks, comprising a suitable frame; a plate secured to the front edge thereof; a flange formed on one side of said plate having a slot through which the metal bar is passed from which the calks are formed; a downwardly-extending groove formed in said flange and communicating with said slot, said groove being beveled and extending inwardly along said slot; a shaping and cutting die slidably mounted in said frame and provided with a shaping and cutting edge coöperating with the grooves of the said flange; a shaping-die slidably mounted in said frame and operatively connected with said shaping and cutting die, and an operating-lever, substantially as described.

2. A machine for making calks, comprising a suitable frame; a shaping and cutting die slidably mounted therein; a shaping-die slidably mounted in said frame and operatively connected with said shaping and cutting die and provided with a shaping slot and groove, an adjustable plate mounted in said frame; a lug formed on said plate and having an inclined face adapted to coact with a beveled face formed on the said shaping-die; and a lever adapted to depress the said dies, substantially as described.

3. A machine for making calks, comprising a suitable frame, a lever pivoted therein, a shaping and cutting die slidably mounted in said frame and adapted to be depressed by said lever, a shaping-die slidably mounted in said frame and engaging said shaping and cutting die by a pin-and-slot connection; an adjustable plate mounted in said frame and provided with a shaping-lug adapted to coact with the shaping-die, the construction and arrangement being such that the initial movement of the cutting-dies forms the spur and severs the calk and the subsequent movement of the cutting and shaping dies finishes the calk, substantially as described.

4. A machine for making calks, comprising a suitable frame, a lever pivoted therein, a shaping and cutting die and a shaping-die slidably mounted in said frame and having a loose connection with each other, the meeting faces of said dies being adapted to cut and shape the calk; an adjustable plate having a shaping-lug adapted to coact with the said shaping-die, substantially as described.

In witness whereof I have hereunto set my hand in the presence of two witnesses.

CAMIL ABONDEUS FILION.

Witnesses:
 N. WILL FOSTER,
 R. D. NEEDHAM.